M. CAISSE.
Churn.
No. 222,570. Patented Dec. 16, 1879.
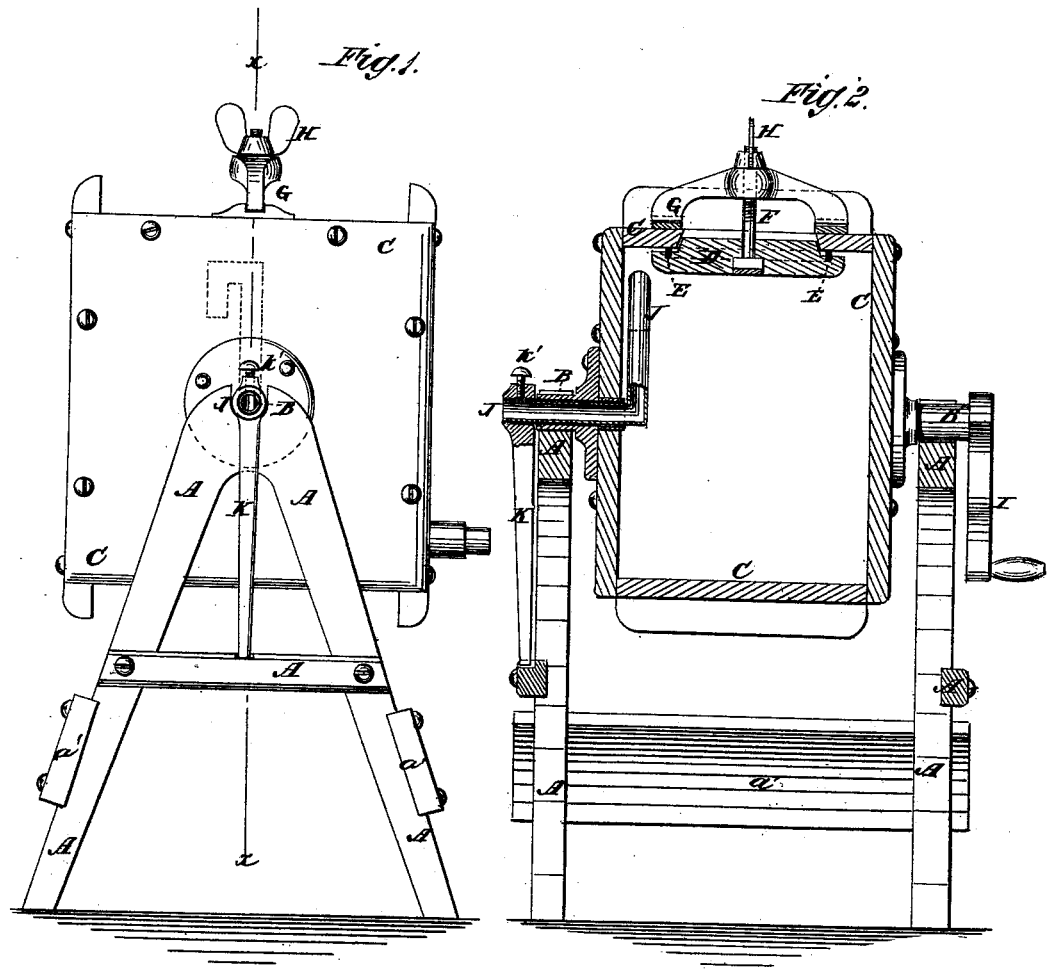
WITNESSES:
INVENTOR:
M. Caisse
BY Munn
ATTORNEYS.

UNITED STATES PATENT OFFICE.

MAXIME CAISSE, OF DANVILLE, SHIPTON TOWNSHIP, RICHMOND COUNTY, QUEBEC, ASSIGNOR TO JAMES B. BURBANK AND SIMEON B. BURBANK, OF SAME PLACE, ASSIGNORS OF ONE-HALF OF THEIR RIGHT TO ARTHUR J. CLEVELAND, OF RICHMOND, CANADA.

IMPROVEMENT IN CHURNS.

Specification forming part of Letters Patent No. 222,570, dated December 16, 1879; application filed October 9, 1877.

*To all whom it may concern:*

Be it known that I, MAXIME CAISSE, of Danville, in the township of Shipton, county of Richmond, Province of Quebec, and Dominion of Canada, have invented a new and useful Improvement in Rotary Churns, of which the following is a specification.

Figure 1 is an end view of my improved churn. Fig. 2 is a vertical section of the same, taken through the line *x x*, Fig. 1.

Similar letters of reference indicate corresponding parts.

This invention has relation to rotary aerating churns; and it consists in providing the central air-pipe, around which the churn-body rotates, with an adjustable locking-arm for fixing it in position adjustably during the revolutions of the churn, substantially as hereinafter more fully set forth, and particularly pointed out in the claim.

A A are two A-shaped frames, which are connected near their lower ends by two cross-bars, *a'*. In notches or half-bearings in the vertices of the frames A revolve two gudgeons, B, which are attached to the opposite sides of the churn-body C. The churn-body C may be made rectangular, cylindrical, or of any other desired form, and in one of its sides, taken as the top, is formed an oblong hole, which is closed from the inner side by a cover, D. The cover D is rabbeted around its edge to fit into the hole in the churn-body, and has a rubber packing, E, secured to the shoulder of said rabbet, to rest against the inner surface of the churn, around the hole through it, to make the joint tight.

To the center of the cover D is attached a bolt, F, which passes through a hole in the center of the bail G, and has a hand-nut, H, screwed upon its outer end. The ends of the bail G rest upon the outer surface of the churn-body C, or in sockets in said churn-body.

One of the gudgeons B is solid, and to it is attached the crank I, by means of which the churn-body C is rotated. The other gudgeon, B, is hollow, and through it is passed a pipe, J, which passes in through the side of the churn-body C, and is bent upward.

The end of the upwardly-projecting arm of the pipe J is bent over, and said inner arm is made of such a length that its end will not be struck by the churn-body as it is rotated. The outer end of the pipe J projects beyond the outer end of the hollow gudgeon B, and passes through a hole in the arm K, where it is secured in place by a set-screw, *k'*, or other convenient means. The other end of the arm K enters a notch in a bar of the frame A, or is otherwise secured in place, so as to hold the pipe J stationary, and thus keep the upper end of the inner arm of the said pipe in the upper part of the churn-body C while the said churn-body is being revolved.

By this arrangement the milk cannot escape through the pipe J, while the said pipe allows the gases generated by the operation of churning to escape freely and admits fresh air, so as to greatly quicken the operation of churning, improve the quality of the butter, and increase its quantity.

It will be observed that the bent pipe J will remain stationary during the revolutions of the churn, held by the locking-arm K, and that the angle of said pipe in relation to the locking-arm may be adjusted by loosening the set-screw *k'* and again fastening it after the adjustment has been effected, so that the aerating-pipe J may be set at such an angle, depending upon the quantity of cream in the churn, as will bring its downward-bent outlet into close proximity to the cream without, at the same time, permitting this to escape through it.

Having thus described my invention, I claim as new and desire to secure by Letters Patent—

In a rotary aerating-churn, the combination, with the rotary churn-body C, of the centrally-inserted bent pipe J and locking-arm K, adjustable in its relation to pipe J by a set-screw, *k'*, substantially as set forth.

MAXIME CAISSE.

Witnesses:
TIMOTHY LEET,
U. BONNEVILLE.